US011677575B1

(12) United States Patent
Libin

(10) Patent No.: US 11,677,575 B1
(45) Date of Patent: Jun. 13, 2023

(54) ADAPTIVE AUDIO-VISUAL BACKDROPS AND VIRTUAL COACH FOR IMMERSIVE VIDEO CONFERENCE SPACES

(71) Applicant: mmhmm inc., Little Rock, AR (US)

(72) Inventor: Phil Libin, San Francisco, CA (US)

(73) Assignee: mmhmm inc., Little Rock, AR (US)

( * ) Notice: Subject to any disclaimer, the term of this patent is extended or adjusted under 35 U.S.C. 154(b) by 0 days.

(21) Appl. No.: 17/491,561

(22) Filed: Oct. 1, 2021

Related U.S. Application Data

(60) Provisional application No. 63/087,593, filed on Oct. 5, 2020.

(51) Int. Cl.
  *G06F 15/16* (2006.01)
  *H04L 12/18* (2006.01)
(52) U.S. Cl.
  CPC ...... *H04L 12/1831* (2013.01); *H04L 12/1822* (2013.01)
(58) Field of Classification Search
  None
  See application file for complete search history.

(56) References Cited

U.S. PATENT DOCUMENTS

| 10,812,424 | B1* | 10/2020 | Bommaraju | H04L 51/046 |
| 2011/0295392 | A1* | 12/2011 | Cunnington | G06Q 10/10 |
| | | | | 702/19 |
| 2015/0149540 | A1* | 5/2015 | Barker | H04L 12/1831 |
| | | | | 709/204 |
| 2015/0154291 | A1* | 6/2015 | Shepherd | H04L 67/535 |
| | | | | 707/748 |
| 2016/0042648 | A1* | 2/2016 | Kothuri | A63F 13/92 |
| | | | | 434/236 |
| 2018/0323985 | A1* | 11/2018 | Safa | H04L 12/1822 |
| 2019/0088153 | A1* | 3/2019 | Bader-Natal | H04N 7/155 |
| 2019/0124128 | A1* | 4/2019 | Bader-Natal | H04L 65/4038 |
| 2020/0228359 | A1* | 7/2020 | el Kaliouby | G06V 40/174 |
| 2021/0097875 | A1* | 4/2021 | Alexander, IV | H04L 12/1822 |
| 2021/0176429 | A1* | 6/2021 | Peters | G06V 20/41 |

FOREIGN PATENT DOCUMENTS

WO WO-2019060338 A1 * 3/2019 ............. G09B 5/065

* cited by examiner

*Primary Examiner* — Phyllis A Book
(74) *Attorney, Agent, or Firm* — Muirhead and Saturnelli, LLC

(57) ABSTRACT

Adapting an audio-visual presentation includes assessing a degree of engagement for at least some of the participants by monitoring participant reactions and feedback to the audio-visual presentation, creating a histogram having a plurality of bins that each represent a number of participants exhibiting a particular degree of engagement, comparing histogram values to predetermined engagement goals for the audio-visual presentation, and modifying the audio-visual presentation in response to the feedback and to the histogram values indicating deviation from the predetermined engagement goals for the audio-visual presentation. Degrees of engagement may be positive/productive, angry/over-reacting, or indifferent. The feedback may include verbal and non-verbal cues of the participants. The non-verbal cues may include gaze direction and facial expressions that are captured by cameras of the participants and/or results of physiological monitoring of the participants. Physiological monitoring may monitor pulse rate, perspiration, facial color, and/or galvanic skin response.

19 Claims, 12 Drawing Sheets

ADAPTIVE AUDIO-VISUAL BACKDROPS AND VIRTUAL COACH FOR IMMERSIVE VIDEO CONFERENCE SPACES

CROSS-REFERENCE TO RELATED APPLICATIONS

This application claims priority to U.S. Prov. App. No. 63/087,593, filed on Oct. 5, 2020, and entitled "ADAPTIVE AUDIO-VISUAL BACKDROPS AND VIRTUAL COACH FOR IMMERSIVE VIDEO CONFERENCE SPACES", which is incorporated herein by reference.

TECHNICAL FIELD

This application is directed to the field of audio-video conferencing and presentation of information, and more particularly to the field of supplying adaptive audio-video backdrops and a virtual coach of a presenter for individual audio-video conferencing spaces with shared virtual channels and immersive presenters.

BACKGROUND OF THE INVENTION

Following key trends in the proliferation of distributed workforce, video conferencing has quickly gained the position of the most important productivity medium, connecting people through their work, education, personal and family lives. According to recent market research, the size of global video conferencing market has reached $5.6 billion USD in 2019 and was recently predicted to grow to $10-$20 billion by 2027; these projections will likely be dwarfed by the skyrocketing demand in efficient visual communications related to the COVID-19 pandemic and to associated long-term changes in team collaboration and productivity paradigms. On an average day, US businesses have video conferencing meetings with hundreds of millions of daily participants: Zoom alone has over 300 million daily participants in its video meetings; during the quarantine months of 2020, Google Hangout Meets had over 100 million daily participants, while Microsoft Teams had almost 75 million active daily users in 2020.

Market statistics show that 55% of companies allow for remote work, with 62% of employees working from home occasionally and 30% already being full-time remote workers. Productivity gains from video conferencing has been captured by many polls; thus, 43% of workers believe that video conferencing can enhance their productivity and 89% of employees who already use video conferencing state that it reduces project completion time. For corporate businesses, 78% use video conferencing to facilitate team collaboration, while 58% of businesses use video conferencing very regularly, having it as part of their daily operations.

SUMMARY OF THE INVENTION

According to the system described herein, adapting an audio-visual presentation includes assessing a degree of engagement for at least some of the participants by monitoring participant reactions and feedback to the audio-visual presentation, creating a histogram having a plurality of bins that each represent a number of participants exhibiting a particular degree of engagement, comparing histogram values to predetermined engagement goals for the audio-visual presentation, and modifying the audio-visual presentation in response to the feedback and to the histogram values indicating deviation from the predetermined engagement goals for the audio-visual presentation. Degrees of engagement may be positive/productive, angry/over-reacting, or indifferent. The feedback may include verbal and non-verbal cues of the participants. The non-verbal cues may include gaze direction and facial expressions that are captured by cameras of the participants and/or results of physiological monitoring of the participants. Physiological monitoring may monitor pulse rate, perspiration, facial color, and/or galvanic skin response. The verbal cues may include common or group text chat, voice comments allowed during conference breaks and/or privately exchanged by groups of meeting participants, or quick polling of individual participants. The quick polling may include presenting participants with a multiple choice, one-question popup form. The feedback may include posture, body language and/or gestures captured by cameras of one or more presenters of the audio-visual presentation. Adapting an audio-visual presentation may also include a virtual coach providing direction to one or more presenters of the audio-visual presentation. The virtual coach may advise the one or more presenters to change posture, speak louder, speak softer, speak slower, speak faster, spend more time on complex slides, and/or skip complex portions of the audio-visual presentation. The feedback may include parameters of the audio-visual presentation. Parameters of the audio-visual presentation may include complexity and density of visual materials, font size, contrast, and color palette of the visual materials, and/or frequency of changing slides for the visual materials. Adapting an audio-visual presentation may also include using a trainable automatic classifier to suggest at least one corrective action to the one or more presenters. The trainable automatic classifier may be provided with training data that is used to correlate the histogram values indicating deviation from the predetermined engagement goals and the feedback with posture of the one or more presenters, talking speed of the one or more presenters, speaking volume of the one or more presenters, time spent on complex slides, time spent on complex portions of the audio-visual presentation, and/or an increase in complexity of the slides. Modifying the audio-visual presentation may include changing virtual backdrops or providing specific audio clips for the audio-visual presentation. Different backdrops and/or different audio clips may be provided to different groups of participants. Adapting an audio-visual presentation may also include providing alternative corrective action following modifying the audio-visual presentation in response to the histogram values indicating deviation from the predetermined goals for the audio-visual presentation after a predetermined time has passed following modifying the audio-visual presentation, wherein the alternative corrective action includes at least one of: providing an alternative backdrop or providing an alternative audio clip. Adapting an audio-visual presentation may also include using a trainable automatic classifier to determine how to change virtual backdrops or provide specific audio clips in response to the histogram values. The trainable automatic classifier may be provided with training data that includes histogram values indicating deviation from the predetermined goals for the audio-visual presentation, one or more backdrops and/or audio clips that were provided in response thereto, and/or subsequent changes in participant engagement levels.

According further to the system described herein, a non-transitory computer readable medium contains software that adapts an audio-visual presentation. The software includes executable code that assesses a degree of engagement for at least some of the participants by monitoring participant reactions and feedback to the audio-visual presentation, executable code that creates a histogram having a plurality of bins that each represent a number of participants exhibiting a particular degree of engagement, executable code that compares histogram values to predetermined engagement goals for the audio-visual presentation, and executable code that modifies the audio-visual presentation in response to the feedback and to the histogram values indicating deviation from the predetermined engagement goals for the audio-visual presentation.

Immersive multi-user interfaces pioneered by mmhmm inc., Prezi Inc., Loom, Inc., and other companies allow presenters to appear next to presentations in individual conference spaces with rich custom backdrops, scene organization means and virtual channels for presentations. Despite the prevalence of different types of interfaces, however, a key efficiency aspect of video conferences is an engagement level of its participants. Multimodal sentiment analysis forms the basis for assessment of participant engagement, emotions and attitude using non-verbal cues, such as facial expressions, postures, gestures, voice tone, along with linguistic sentiment extraction from verbal textual feedback in participant comments, speech-to-text conversion (speech recognition) and, increasingly, physiological monitoring (pulse rate, perspiration, facial color, galvanic skin response, etc.) made possible through growing use of wearable devices and sensors. NICE, Activa and many other vendors are incorporating affective computing and sentiment analysis into real-time assisting systems for automotive industry, Customer Relationship Measurement (CRM), Customer Experience (CS) and other areas. Early attempts have been made in remote education, where sentiment analysis was used to produce emotional profiles of students and applied to the subsequent categorization, processing, and planning of the remote educational processes.

Notwithstanding the progress in applications of sentiment analysis in various areas, automatic facilitation of video conferences presents many unsolved problems. The size of audience (for example, webinars) may be very significant and may be changing during the presentation; measures aimed at increasing user engagement should not obstruct the presentation flow, etc. Accordingly, it is desirable to develop mechanisms and systems for assessment and non-invasive facilitation of participant engagement and enhancing presenter performance in video conferences.

The proposed system provides a goal-driven real-time adaptation of a video conference environment aimed at strengthening participant engagement, including customized backdrops and background audio, and deploys a virtual coach assisting a presenter for the same purpose. Adaptive backdrops may be customized for groups of participants or individual participants. The video conference environment is modified based on input from the participants in the form of measured engagement levels and other feedback. The system also allows arranging virtual copies of physical items from personal collections of a presenter (for example, purchased books, figurines, or sculptures) on immersive furniture, on images of physical furniture or across a virtual presentation room. The assessment of participant engagement is based on a participant engagement index derived from a multi-modal sentiment analysis of participants and presenter(s) of a video conference using a technology stack of emotion recognition components. A decision-making component determines whether one or multiple actions should be taken to improve the participant engagement index. The system builds different instances of a virtual coach with specific sets of advisory rules through machine learning.

Various aspects of system functioning are explained as follows:

1. Characteristics of a Video Conference and of Participant Feedback.

The proposed system applies to video conferences with any number of participants and presenters, including business meetings within and between companies, associations and other organizations, remote lectures and webinars and other videoconference types.

At least a portion of the participants must be running a conferencing software or add-ons (for example, ZOOM+mmhmm) that allow customization of virtual backdrops and delivering background audio to individual participants.

The system may utilize gaze direction and facial expressions captured by the participant and presenter cameras (autonomous or integrated with devices) that are used for the conferencing as main sources of participant reaction to the conference.

Depending on the meeting format, the system may also be able to capture posture, body language and gestures of all or some of the presenters.

Additionally, the system may use different feedback features, such as:
  Common or group text chat.
  Voice comments allowed during conference breaks or privately exchanged by groups of meeting participants that are not broadcasted to the main video stream of the conference.
  Physiological monitoring (pulse rate, perspiration, facial color, galvanic skin response, etc.).
  Quick polling of individual participants by the system, for example, via multiple choice, one-question popup forms in the corner of a screen asking participants about their mood.

The system may be required to obtain permission from the participants to access certain categories of feedback features.

2. Assessing Participant Engagement. Participant Engagement Index.

The system may provide real-time monitoring of participant reactions and feedback and apply a technology stack with emotion recognition/affective computing and sentiment analysis components to assess participant engagement. As an example, various degrees of engagement may be expressed by the scale:

{Positive/productive mood|Angry/over-reacting mood|Indifferent mood}

Feedback of video conference participants may exhibit various verbal characteristics and non-verbal cues; since the set of available measurements of participant feedback may vary from participant to participant (some participants may be actively chatting or voicing their opinions while others may remain silent; a portion of participants may open their wearable devices to the system for measuring emotional feedback, while others may not have such devices or may not permit use of the devices by the system), the accuracy of assessing participant engagement may have different confidence intervals and an overall engagement picture may be probabilistic.

The system may aggregate participant engagement through the dynamic participant engagement index (PEI), represented as a histogram of the numbers of participants currently characterized by each degree of engagement.

Participant attention, reactions and engagement levels may oscillate through a conference flow, therefore, momentary (vector) values of the PEI may require further aggregation by the time intervals. A sufficiently long period of undesirable values of the PEI (for example, when the percent of participants with the positive/productive mood stays below 50% of all participants for a continuous three-minute period) may signify a problem and cause a decision-making component of the system to search for an action to improve participant engagement.

3. Analyzing Presentation and Presenter Behavior.

Simultaneously with the participant feedback, various parameters of the presentation and of presenter behavior may be collected as a separate feedback component. The parameters may include speech characteristics of the presenter, such as talking speed, volume, pauses, pitch, emphasis, along with the parameters of visual materials, including complexity and density of visuals on various slides, font size, contrast, color palette, frequency of changing slides, etc.

The system may constantly correlate the presenter related feedback with the PEI or may use a pre-built automatic classifier to identify advisable corrections of behavior or presentation flow of the presenter in case of unsatisfactory PEI values. For example, the system may detect a correlation between (i) presenter's slouching, increased talking speed, a sequence of complex slides or other specifics of presentation or presenter behavior and (ii) a negative change in the PEI for a sufficiently long period of time. The system may subsequently look for appropriate advice stored in a trainable model of the virtual coach, which utilizes a trainable automatic classier. If present, the advice may be delivered as a next action of the virtual coach; otherwise, the situation may be added as a training sample for subsequent machine learning.

4. Decision-Making and System Actions.

If the PEI stays at an undesirable level for a sufficient period of the scheduled conference time, the system may use a decision-making component to determine an appropriate system response. The decision-making component may analyze the PEI and the behavior of each participant whose engagement is at a low level and may choose the course of system actions as follows:

The decision-making component may choose to alter backdrops of individual conference rooms for some of the presenters to stimulate a change in a mood of participants, for example, to calm down over-reacting participants and/or energize indifferent participants. The decision-making component may also play a quiet background audio to amplify a visual effect of backdrops. New backdrops and audio clips may be stored in a designated portion of system resources and may be introduced through various visual (contrast, color, ornament, visual effects, text elements) and audio (pitch, melody, accompaniment) means, signifying a "call for action" to change an attitude of some or all of the participants.

Different customized backdrops and audio may be delivered to different groups of participants or even to individual participants based on an assessment of emotional status and engagement of the participants.

The system may monitor the effect of custom backdrop and music on the PEI and on the engagement levels of individual participants. If engagement of the participants does not improve or improves slowly, the system may alter the backdrop and audio samples for an interval of time, assessing the effect of each item, and may subsequently continue with the item that has shown the best progress for a particular group of participants or for individual participants.

The decision-making component may present the feedback and engagement analytics to meeting organizers or signal to a presenter that things aren't going well.

A virtual coach may be activated and may deliver specific behavioral advice to the presenter (in most cases, privately, via a dedicated presenter panel), such as:
Making a brief pause in the presentation to allow the background music and the new backdrops to kick in.
Changing presenter's posture ("don't slouch", "turn more often to the audience").
Speaking louder or softer, slower, or faster.
Spending more time on complex slides or skipping most complex portions of the presentation in case too many participants look overwhelmed.

5. Statistics and Machine Learning.

The system may collect and process engagement analytics and associate the analytics with the presentations, presenters and system action performed during the conference. Statistics based on the analytics may be added to an aggregated statistics repository of the system; reports may be periodically presented to meeting organizers and to presenters. Fragments of a conference accompanying the analytics and an associated PEI may be used as training materials for machine learning, improving the efficiency of actions and performance of a virtual coach, as explained above.

For example, the training data provided to the analytics component may be used to correlate the histogram values indicating deviation from the predetermined engagement goals (based on participant and presenter related feedback) with at least one of: posture of the one or more presenters, talking speed of the one or more presenters, speaking volume of the one or more presenters, time spent on complex slides, time spent on complex portions of the audio-visual presentation, or an increase in complexity of the slides. Machine learning based on these training data may inform the virtual coach through an automatic classifier and help the virtual coach provide adequate recommendations to the presenter.

Analogously, another portion of the automatic classifier (or a separate automatic classifier) may utilize training data that includes histogram values indicating deviation from the predetermined goals for the audio-visual presentation, one or more backdrops and/or audio clips that were provided in response to such deviations, exposure time for such backdrops and/or audio clips, and subsequent changes in participant engagement levels marking such session of changes in automatic backdrops either success or failure and recommending changes in the presentation environment (i.e. backdrops and/or audio clips) accordingly.

The system may also arrange immersive 3D or 2D copies of items from personal collections of a presenter or other assemblies (such as purchased books, movies, or music DVDs, musical instruments, works of art, such as paintings, figurines, sculptures, etc.) on the virtual furniture, across a virtual presentation room or on video sequences of physical objects in a room of a presenter or in other displayed facility. For example, a collection of books of a presenter purchased at Amazon and AbeBooks may be partially pre-arranged on a bookshelf of the presenter prior to a presentation. Upon a request by participants or as a scheduled portion of a video conference, the presenter may form a task via a verbal query: "Arrange on this bookshelf all fiction books purchased in the last two years". The system may search for all such books, arrange missing books in free spaces on the shelf and move certain previously arranged items. If there isn't enough space, the system may ask for further instructions, for example, adding another bookshelf in a free room space or reprioritize already arranged books and move a portion of the books out of a current arrangement.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a goal-driven real-time adaptation of a video conference environment and deploys a virtual coach assisting presenter for the purpose of strengthening participant engagement; the adaptation includes customized backdrops and background audio. Adaptive backdrops may be customized for groups of participants or individual participants. Input from the participants in the form of measured engagement levels and other feedback is used to control the video conference environment. The system also allows arranging virtual copies of physical items from personal collections of a presenter (for example, purchased books, figurines, or sculptures) on immersive furniture, on images of physical furniture or across a virtual presentation room.

Figure 1:
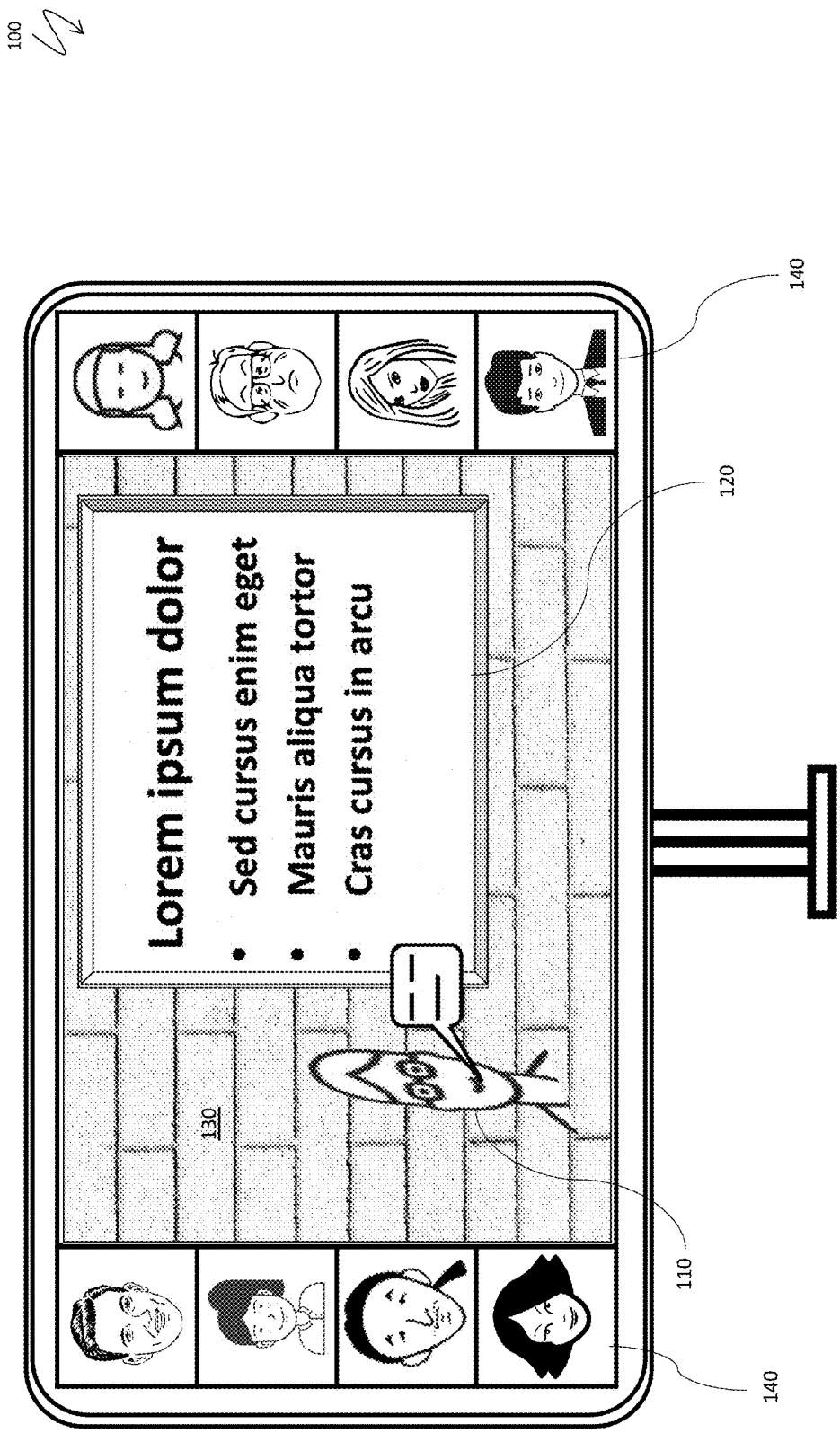
FIG. 1 is a schematic illustration of a video conference with an immersive presentation, according to an embodiment of the system described herein.

FIG. 1 is a schematic illustration 100 of a video conference computer display screen with an immersive presentation. A presenter 110 is immersed into a video conferencing space on the screen, as described in U.S. Pat. No. 11,317,060 titled: "INDIVIDUAL VIDEO CONFERENCING SPACES WITH SHARED VIRTUAL CHANNELS AND IMMERSIVE USERS", issued on Apr. 26, 2022 and incorporated by reference herein. The presenter 110 appears on top of a presentation 120 opened in a virtual channel on top of a virtual backdrop 130 and presents material to meeting participants 140 (the audience).

Figure 2:
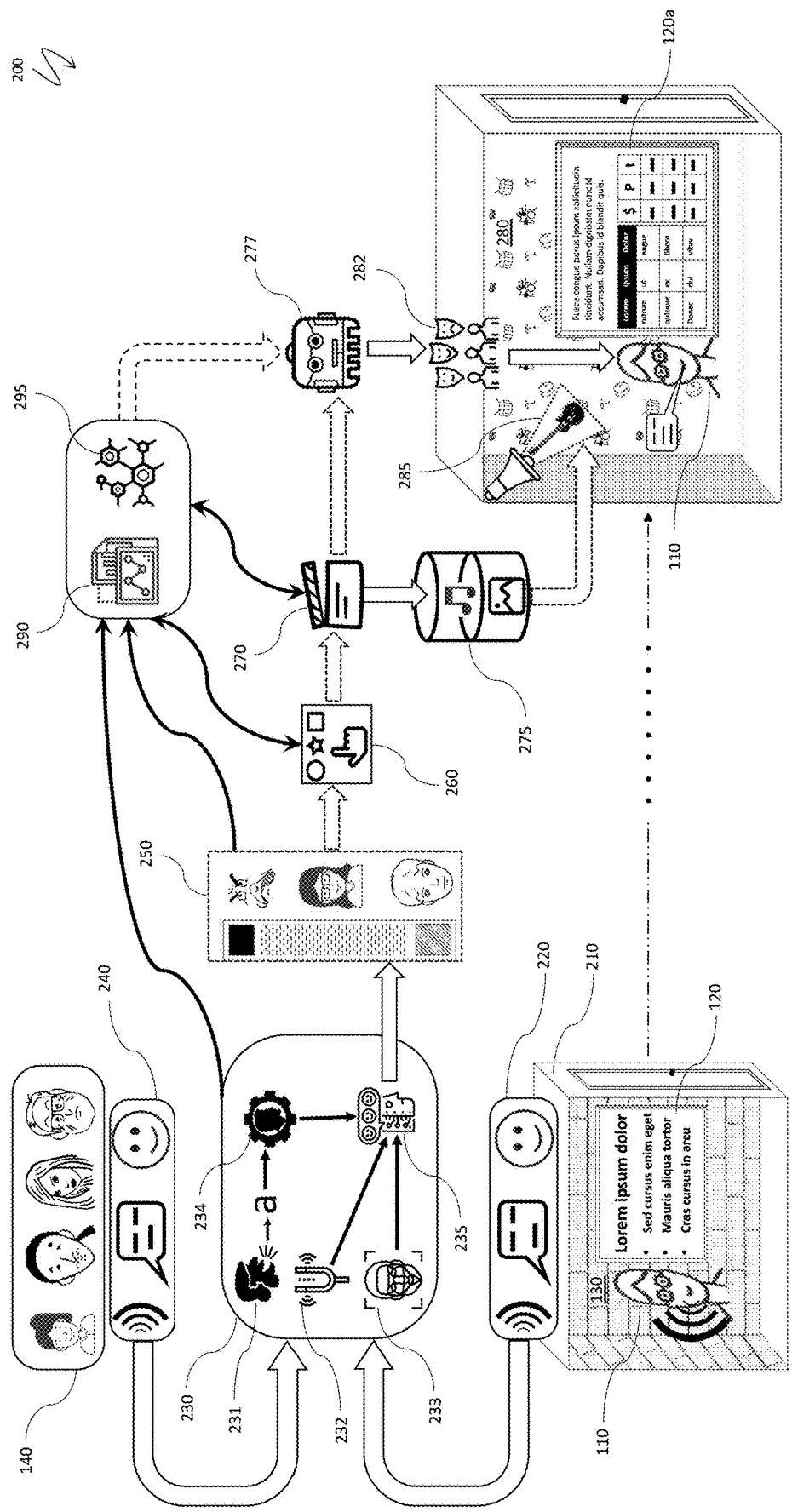
FIG. 2 is a schematic illustration of system components, architecture, and functioning, according to an embodiment of the system described herein.

FIG. 2 is a schematic illustration 200 of the system components, architecture, and functioning. Analogously to FIG. 1, the presenter 110 appears immersed into an individual conference space 210, where the presentation 120 is opened in a virtual channel on top of the virtual backdrop 130. Presentation media and expressive means 220 may include voice, text, and non-verbal cues, such as facial expressions, gestures, postures, etc. The audience 140 of the video conference may also provide the feedback 240 to the presentation in a variety of ways, including voice, text (for example, private conversations between conference participants or broadcasted comments on request of the presenter) and non-verbal cues. Both the presentation media and the audience feedback are processed and analyzed by a technology stack 230, which may include speech recognition (Speech-to-Text, STT) 231, voice emotion recognition 232, facial recognition 233, Natural Language Processing (NLP) 234, and a sentiment analysis component 235, which may aggregate output of the speech recognition 231, voice emotion recognition 232, facial recognition 233, and Natural Language Processing (NLP) 234 for assessment of audience emotional state and engagement.

Based on the sentiment analysis component 235, the system compiles a participant engagement index (PEI) 250, represented as a histogram of the numbers of participants currently characterized by each degree of engagement (or a category of emotional states), as explained elsewhere herein. Each bin (column) of the histogram corresponds to a number of participants exhibiting a particular degree of engagement. Depending on a specific (vector) value of the PEI 250, the system may invoke a decision-making component 260, which may initiate a system action 270.

FIG. 2 illustrates two types of system actions: a goal-driven modification (adaptation) of a conference environment, where a repository of system resources 275 is used to update a virtual backdrop 280 and background audio 285, and invoking a virtual coach 277, which offers real-time behavioral advice 282 to the presenter 110 in response to a more complex portion 120a of the presentation 120.

Recognition data for all technology components, the PEI 250, decision-making results, and initiated system actions are sent to an analytics component 290, which builds system analytics and reports and prepares data for a machine learning component 295. The machine learning component 295 enhances behavioral procedures 282 and advances the model of virtual coach, as shown by the dashed angled block-arrow and explained elsewhere herein. The analytics and machine learning components also enhance the decision-making process 260 and the specific system actions 270 (such as the choice of virtual backdrops 280 and background audio 285), as shown by the solid bidirectional arrows.

Figure 3:
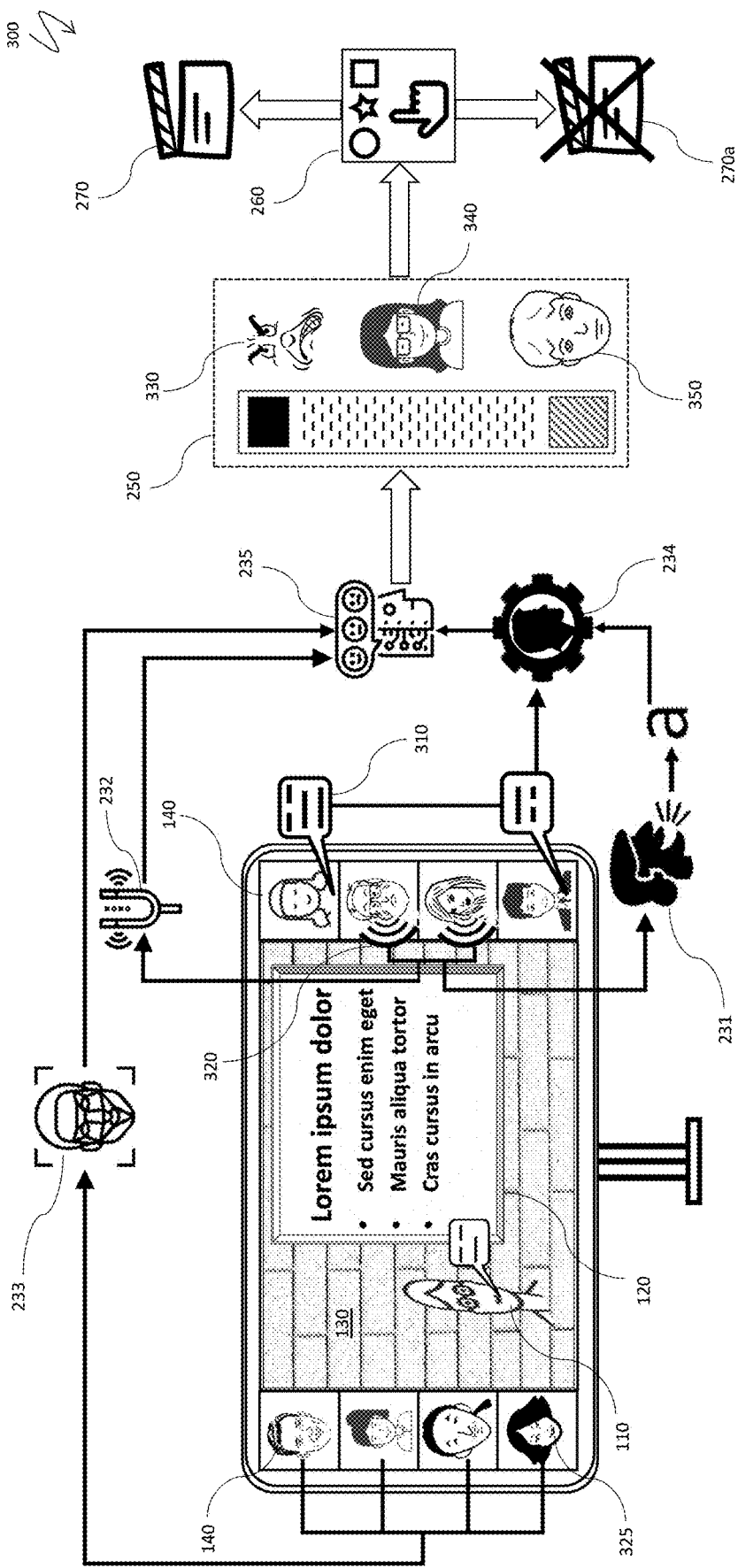
FIG. 3 is a schematic illustration of processing audience feedback and of decision workflow, according to an embodiment of the system described herein.

FIG. 3 is a schematic illustration 300 of processing audience feedback and of a decision workflow. Similarly to FIGS. 1, 2, the immersive presenter 110 appears in a video conference environment with the presentation materials 120 displayed in a virtual channel on top of the virtual backdrop 130. FIG. 3 illustrates three types of feedback of the audience 140: text messages 310 (that may be posted in the general chat pane of the video conference or in private conversational threads between meeting participants), voice communications 320 (voice exchanges in private sessions between participants, as well as public feedback broadcasted to all participants 140, including the presenter 110), and facial expressions 325.

Accordingly, there are four different processing paths for the above types of audience feedback: (i) text messages 310 are directed to the NLP component 234, which analyzes the text and sends in in the preprocessed form to the sentiment recognition engine 235; (ii) voice communications 320 follow the same path, with the additional step of speech recognition 231; (iii) additionally, voice communications 320 are delivered to the voice emotion recognition component 232, which directly delivers output to the sentiment recognition engine 235; (iv) data on facial expressions 325 is entered into the facial recognition component 233, which transfers recognized emotional states to the component 235.

The sentiment analysis component 235 aggregates all feedback data and their interpretation by other components of the technology stack, categorizes data as necessary, calculates and normalizes the numbers of conference participants currently representing each category, and builds a dynamic vector value of the PEI 250. In the example of FIG. 3, the PEI 250 has three levels of engagement of conference participants, as explained elsewhere herein: angry/overreacting mood 330, positive/productive mood 340, and indifferent mood 350. Based on the height of the three columns in the column stack of the PEI 250, the system may conclude that the positive, productive mood prevails at a given moment of the video conference.

When necessary, the system may initiate the decision-making component 260 to determine the course of the system actions 270 or refrain from a system action at a given moment, as shown by an item 270a.

Figure 4:
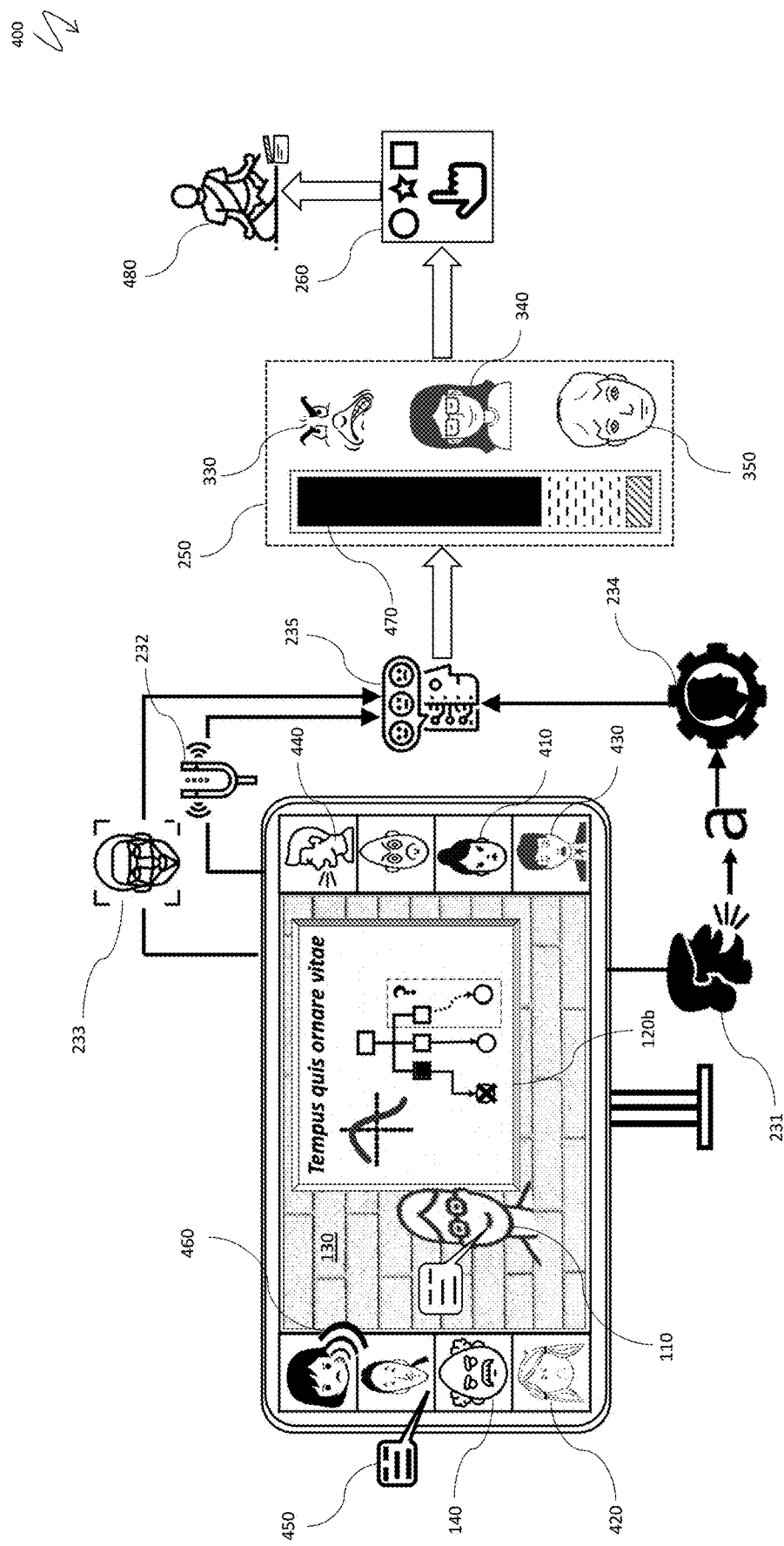
FIG. 4 is a schematic illustration of processing negative audience feedback and choosing an associated system action, according to an embodiment of the system described herein.

FIG. 4 is a schematic illustration 400 of processing negative audience feedback and choosing an associated system action. Similarly to the previous drawings, the immersive presenter 110 is talking to the audience 140 about presentation material 120b opened in a virtual channel over the virtual backdrop 130. Most of the video conference participants shown in FIG. 4 display a negative attitude towards the current phase of the presentation. Thus, facial expressions of the participants 410, 420 reveal anger, a participant 430 displays disappointment, a participant 440 makes an angry exclamation (not necessarily broadcasted to the conference but nevertheless captured by the system), a participant 450 writes an angry text comment and a participant 460 makes an angry voice comment. The system processes the audience feedback using the workflow explained in detail in conjunction with FIG. 3. Specifically, voice comments are recognized by the STT component 231 and sent to the NLP component 234 along with a text message from the participant 450; voice emotions are analyzed by the component 232, facial expressions by the component 233, and the outputs of the components 232, 233, 234 are aggregated by the sentiment recognition engine 235, which determines that the PEI 250 is abnormal and the angry status 330 prevails, as shown by the height of a first column 470 of the PEI 250, significantly exceeding the summary height of the columns corresponding to the productive state 340 and indifferent state 350.

Following the unsatisfactory reading of the PEI 250, the system initiates the decision-making component 260 and determines that an appropriate response will be provided by a calming system action 480.

Figure 5:
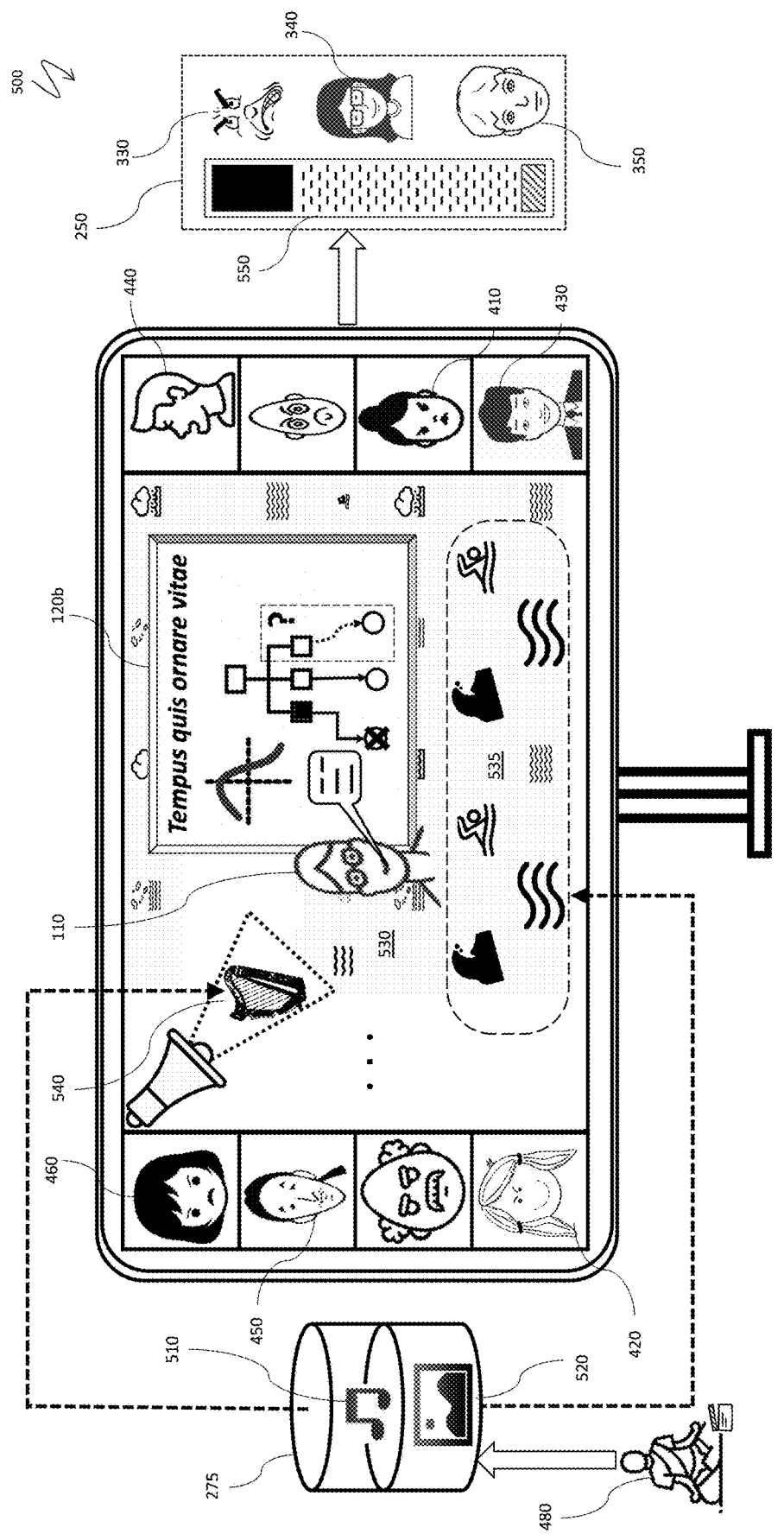
FIG. 5 is a schematic illustration of altering a virtual backdrop and adding a background audio, according to an embodiment of the system described herein.

FIG. 5 is a schematic illustration 500 of altering a virtual backdrop and adding background audio. FIG. 5 illustrates specific action and the audience reaction to the situation explained in FIG. 4. Analogously to FIG. 4, the presenter 110 explains to the audience the presentation 120b. The calming system action 480 (see FIG. 4 and the accompanying text) causes the system to look up the repository of system resources 275 for appropriate audio content 510 and imaging content 520, which causes the system to replace the previous virtual backdrop with a calming backdrop 530 (highlighted as a fragment 535); simultaneously background audio 540 starts playing. At the same time, a virtual coach (not shown in FIG. 5) may privately recommend the presenter 110 to pause and possibly change the topic of the presentation 120b for a short while. The results of the system action are shown in the audience pane: the new facial expressions of the participants 410, 420, 430, 440, 450 have turned from unfavorable to neutral or to favorable expressions; the participant 460 still looks displeased but stopped the voice comment.

Accordingly, the vector value of the PEI 250 has dramatically improved and a column of the PEI 250 indicating angry attitudes corresponding to the state 330 has significantly shortened; the column indicating the indifferent state 350 did not change, while the height of a column 550 corresponding to the positive attitudes 340 has become dominant. Accordingly, the system may record a successful system action in the analytics module and add corresponding data to training material (not shown in FIG. 5).

Figure 6:
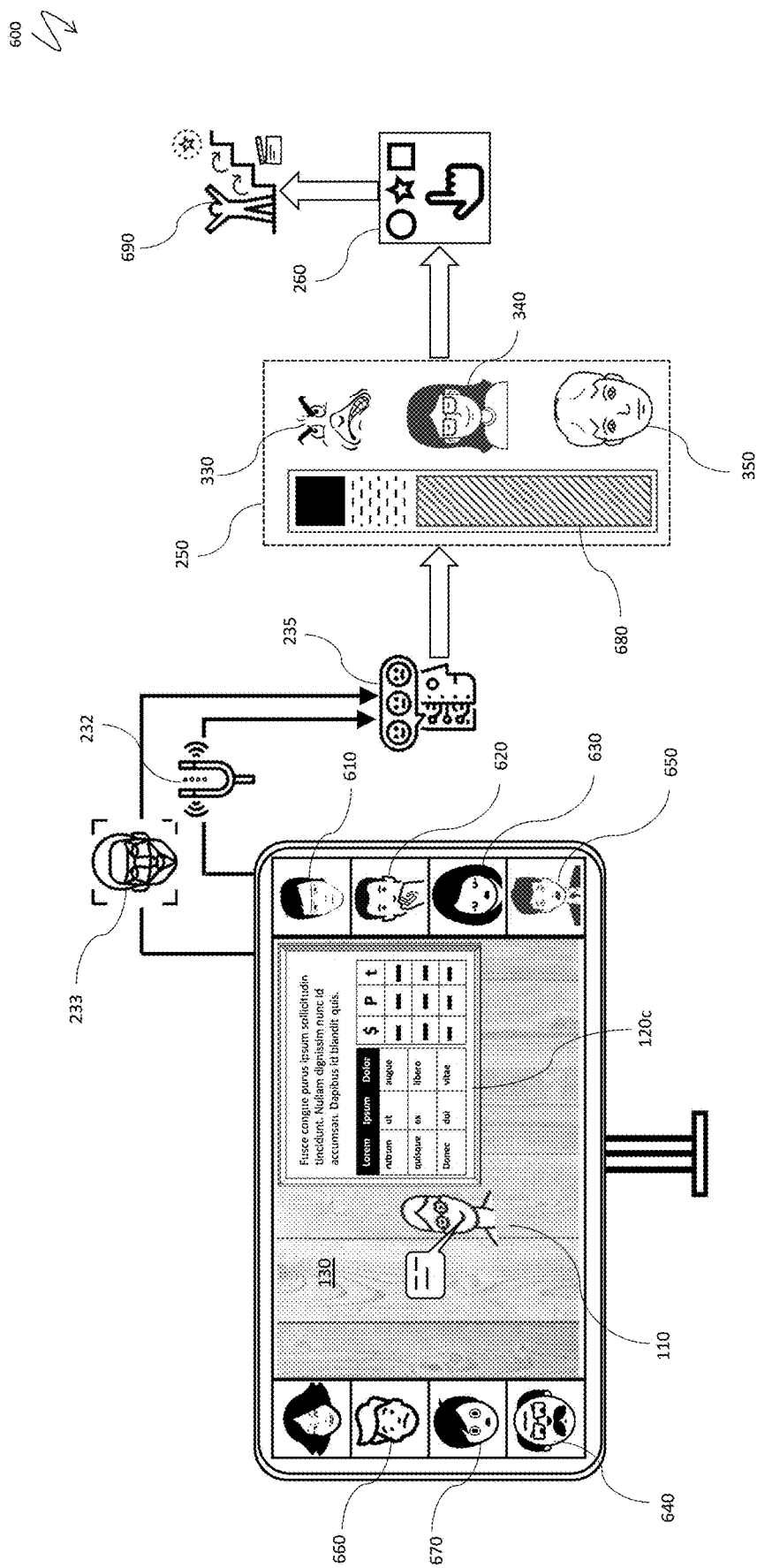
FIG. 6 is a schematic illustration of processing an indifferent audience feedback and choosing an associated system action, according to an embodiment of the system described herein.

FIG. 6 is a schematic illustration 600 of processing indifferent audience feedback and choosing an associated system action. Similarly to the previous drawings, the immersive presenter 110 is making a presentation based on a presentation 120c opened in a virtual channel over the virtual backdrop 130. Most of the video conference participants shown in FIG. 6 display different degrees of an indifferent or bored attitude towards the current phase of the presentation 120c, as illustrated by facial expressions of the participants 610, 620, 630, 640, 650, 660, 670. The audience feedback is processed using the technology components 232, 233, 235 resulting in an abnormal PEI 250, showing a high degree 680 of indifference and boredom (the state 350) with respect to a current phase of the presentation 120c, compared with only moderate values of the two other states 330, 340. Based on this outcome, the system initiates the decision-making component 260 and determines that the appropriate response will be provided by an energizing system action 690.

Figure 7:
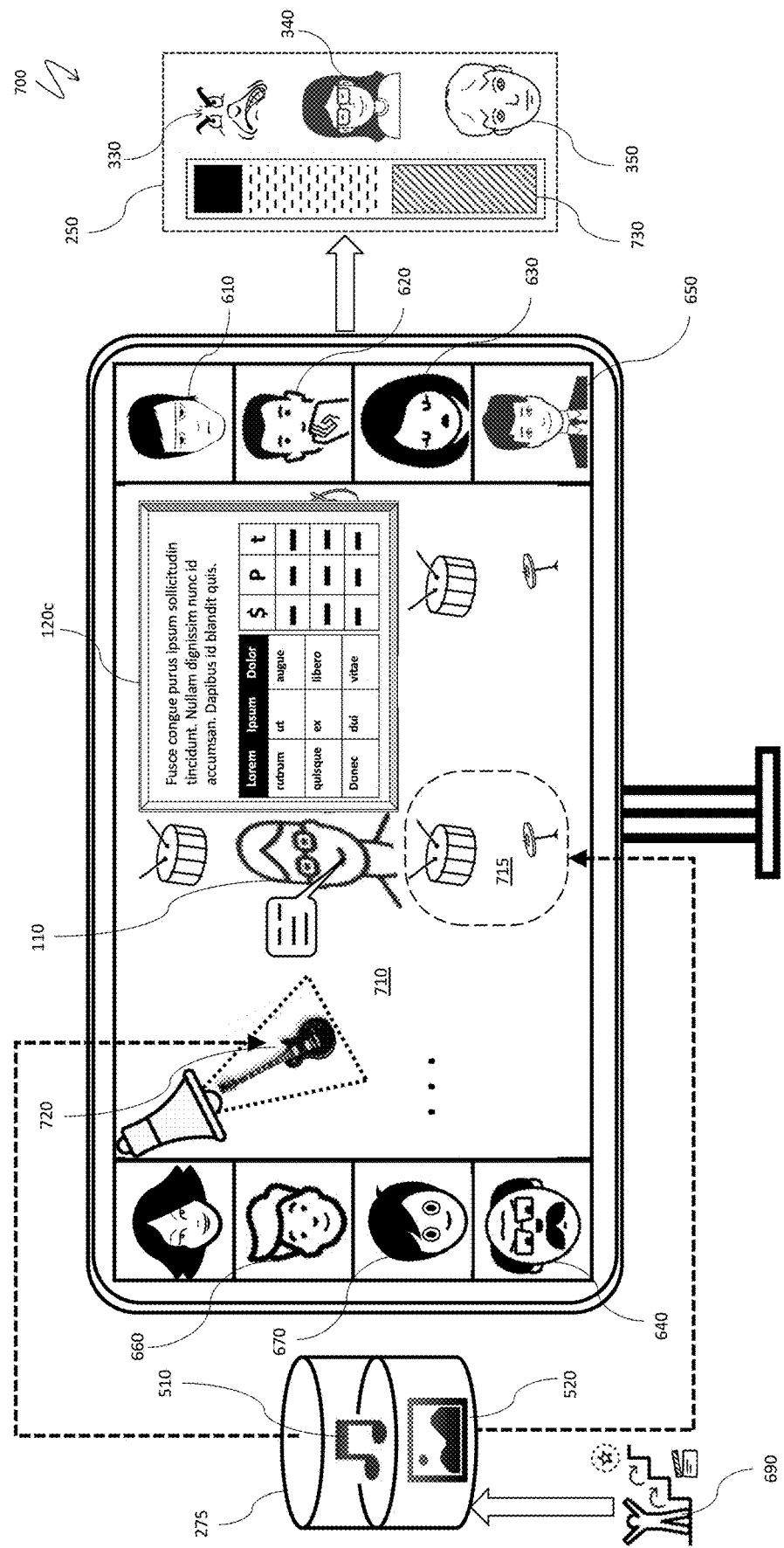
FIG. 7 is a schematic illustration of a situation where an altered virtual backdrop and background audio prove insufficient, according to an embodiment of the system described herein.

FIG. 7 is a schematic illustration 700 of a situation where an altered virtual backdrop and background audio prove insufficient. Analogously to FIG. 6, the presenter 110 provides the presentation 120c. The energizing system action 690 (see FIG. 6 and the accompanying text) causes the system to look up the repository of system resources 275 for the appropriate audio content 510 and the imaging content 520, which causes the system to replace the previous virtual backdrop with a calming backdrop 710 (highlighted as a fragment 715); simultaneously, background audio 720 starts playing. At the same time, a virtual coach (not shown in FIG. 7) may privately recommend the presenter 110 to pause and take other measures to improve the PEI 250. The results of the system action are shown in the audience pane and aren't completely satisfactory: based on the facial expressions, the attitudes of the users 610, 620, 630, 640 remained the same, while the attitudes of other ones of the users 650, 660, 670 have improved towards neutral a productive state.

Technology components and workflow are omitted in FIG. 7 but the resulting vector value of PEI 250, while improved, is still abnormal as almost half of the audience still has a low degree of engagement, which is characterized by the indifferent/bored state 350: the height of a column 730 corresponding to the indifferent/bored state 350 is almost equal to a summary height of columns for the other states 330, 340. The decision-making process is not shown in FIG. 7; the decision to further enhance the current system action is illustrated in the next FIG. 8.

Figure 8:
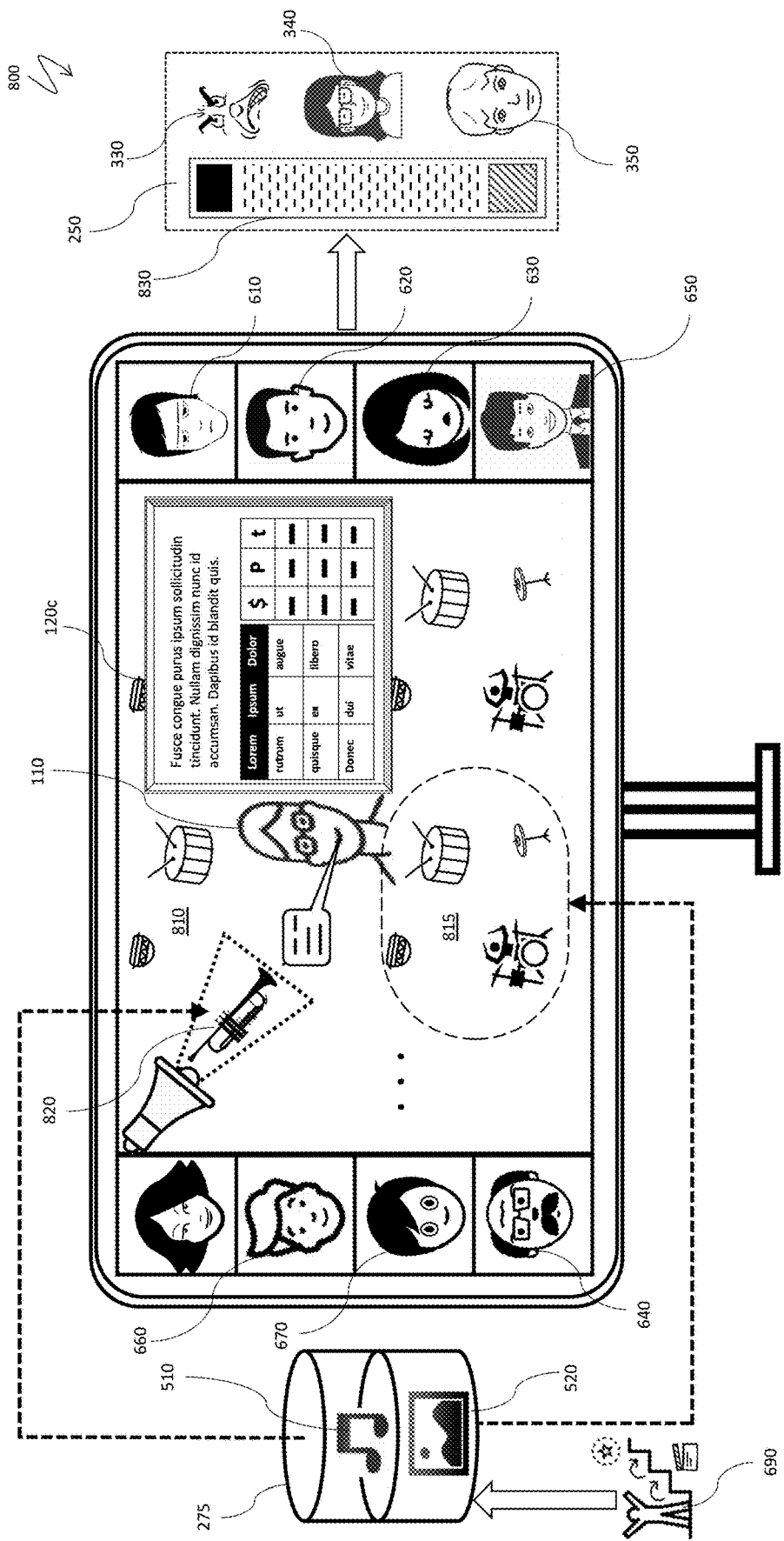
FIG. 8 is a schematic illustration of enhancing a backdrop and background audio, according to an embodiment of the system described herein.

FIG. 8 is a schematic illustration 800 of enhancing the virtual backdrop and the background audio. Similarly to FIGS. 6, 7, the presenter 110 proceeds with the presentation 120c. While the energizing system action 690 has not sufficiently improved the PEI 250 and the engagement of the audience remains relatively low (see FIG. 7 and the accompanying text), the decision-making component (not shown in FIGS. 7, 8) has chosen to continue using the action 690 and to further enhance the virtual backdrop and the background music. Accordingly, the action 690 causes steps to be performs that are similar to steps performed in connection with FIG. 7 (described above) by looking into the audio resources 510 and the visual resources 520 of the repository of system resources 275 but displaying an enhanced, more intense virtual backdrop 810 (as further illustrated by a fragment 815 of the backdrop). Additionally, a more expressive background audio 820 has replaced the previous audio stream. Analogously to FIG. 7, the virtual coach (not shown in FIG. 8) may privately recommend to the presenter 110 certain measures to improve the PEI 250.

Judging by the facial expressions and the absence of negative text or voice comments, the reaction of most video conference participants to the enhanced virtual backdrop and background audio has been encouraging: facial expressions of the participants 620, 640, 650, 660, 670 are neutral or positive, and only two of the participants, 610, 630 remain indifferent or express boredom. The change in attitude and engagement has significantly improved the PEI 250 and a column 830, reflecting the positive/productive state 340, by far exceeds the cumulative height of the columns for the negative states 330, 350. Therefore, the sentiment analysis component 235 may conclude that the two-phase energizing action has succeeded and may reflect this experience in the analytics database (and may use data therefor as an entry data point for a next step of machine learning).

Figure 9:
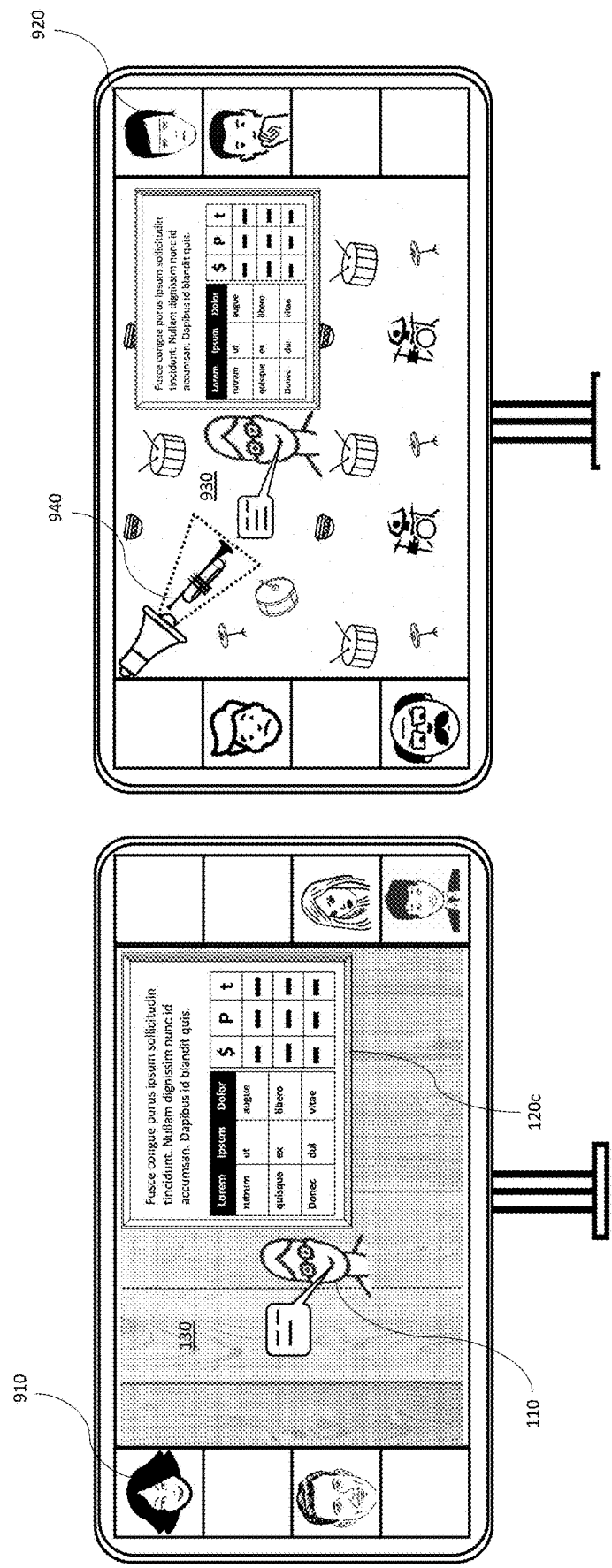
FIG. 9 is a schematic illustration of adapting virtual backdrops and background audio to an individual participant feedback on the fly, according to an embodiment of the system described herein.

FIG. 9 is a schematic illustration 900 of adapting virtual backdrops and background audio to an individual participant feedback on the fly. The presenter 110 provides the presentation 120c opened in a virtual channel on top of the virtual backdrop 130. A set 910 of the video conference participants displays a positive and productive attitude and the system does not take any system actions to change the video conference environment for this portion of the audience. Another portion 920 of the audience, shows indifference or looks bored and the system offers a virtual backdrop 930 and background audio 940 only to the portion 920 of the participants to improve engagement levels thereof. Note that materials and talk of the presentation 120c are the same for all of the participants. If the system identifies more categories of emotional responses and engagements, there may be additional system actions and more individual changes to the presentation environment for different groups of the participants.

Figure 10:
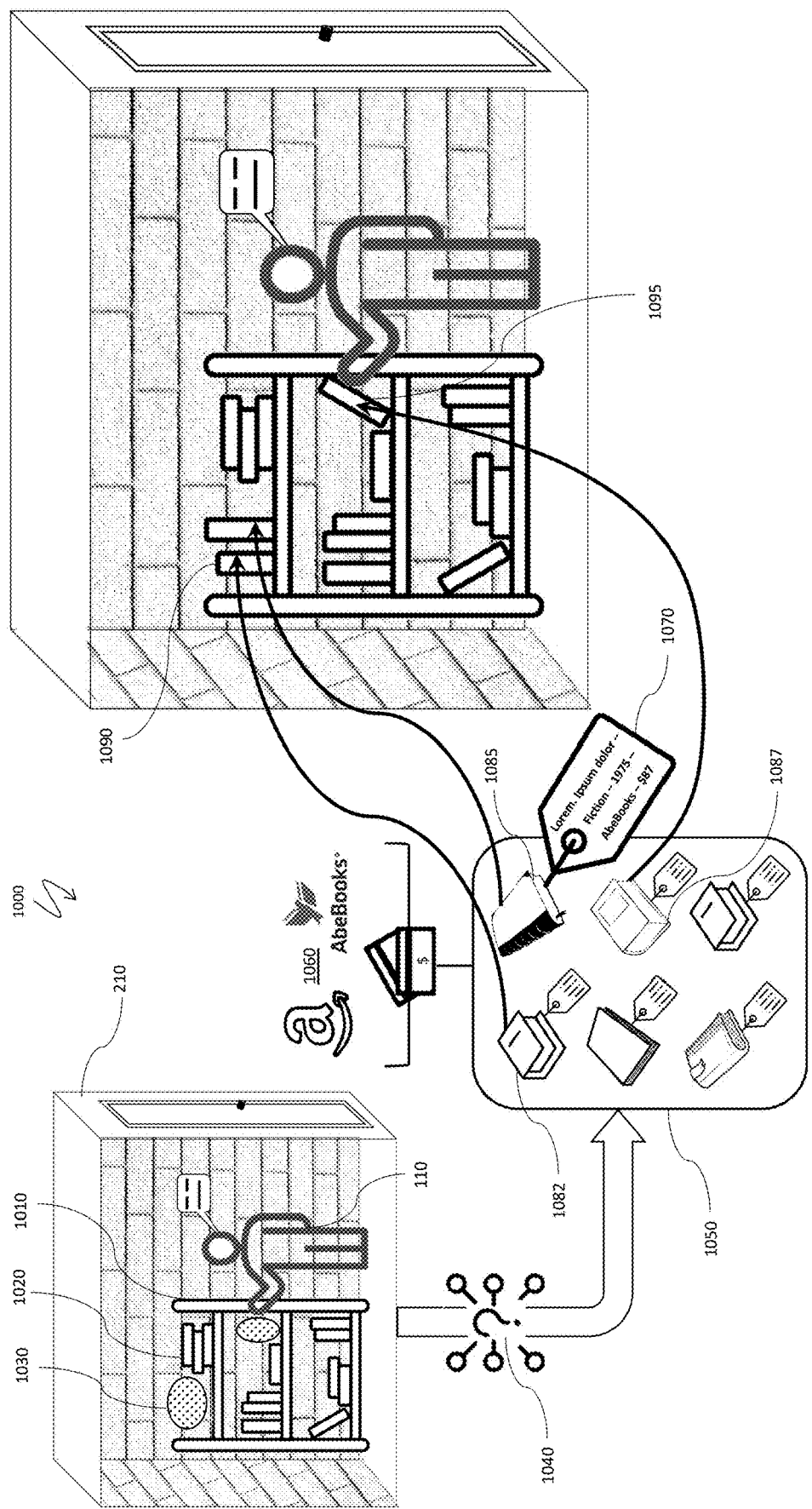
FIG. 10 is a schematic illustration of arranging purchased books on an immersive bookshelf, according to embodiments of the system described herein.

FIG. 10 is a schematic illustration of arranging purchased books on an immersive bookshelf. Analogously to FIG. 2, the presenter 110 appears immersed in the individual conference space 210, where the presenter 110 is demonstrating a personal book collection to an audience (not shown in FIG. 10). Note that an image of the immersive presenter 110 is made semi-transparent so that the presenter 110 could move along the collection without obstructing a view for the audience. A portion of the collection fills a bookcase 1010, where books 1020 may leave some free space 1030. The presenter 110 decides to enhance the demonstration by showing, on the same bookcase, the books recently purchased from certain online retailers that are currently absent from the bookcase.

The presenter 110 enters a query 1040 requesting to fill in the bookcase 1010 with as many recently purchased books from certain retailers 1060 as possible. The system processes the query and identifies a set 1050 of the recently purchased books from the certain retailers 1060; to complete the query, the system examines book records 1070, which include, among other attributes, purchase dates and dimensions. Subsequently, the system identifies items from the set 1050 that satisfy the definition of "recently purchased" and are not currently exhibited on the bookcase 1010 and solves an optimization task of a best possible filling of free spaces on the bookcase 1010 with the items identified in the set 1050. Accordingly, three items 1082, 1085, 1087 from the set 1050 are added to the bookcase, filling the free space 1030 with particular book displays 1090, 1095. Note that, while the added book displays 1090, 1095 are virtual, an original view of the bookshelf 1010 may be a virtual object or a real-time video of a physical bookshelf. Additionally, virtual copies of the added books from the set 1050 may be proportionally resized within feasible limits to maximize additions. The formulation of the task by the presenter 110 may also include permission to remove portions of currently exhibited books and replace the portions with new items. Finally, the content of the collection may not be limited to books and bookcases but may include any other items, such as tools, sculptures, vases, pictures and other works of art, plants, and any other collectable items, arranged within different furniture, storage mechanisms or anywhere in the individual conference space.

Figure 11:
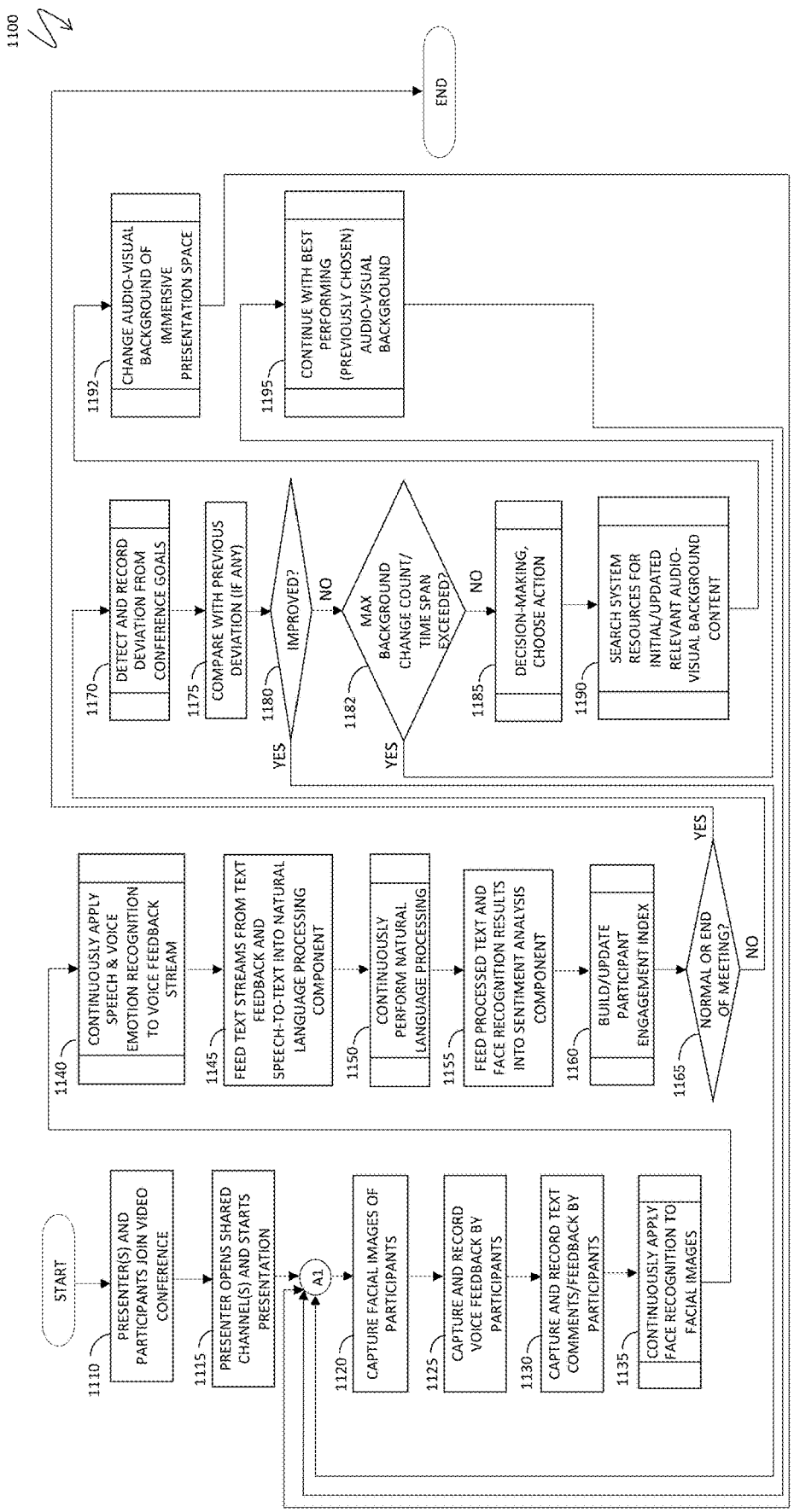
FIG. 11 is a system flow diagram illustrating system functioning in connection with adaptive goal-driven virtual backdrops and background audio, according to an embodiment of the system described herein.

Referring to FIG. 11, a system flow diagram 1100 illustrates system functioning in connection with adaptive goal-driven virtual backdrops and background audio. Processing begins at a step 1110, where presenter(s) and participants join a video conference. After the step 1110, processing proceeds to a step 1115, where the presenter opens shared channel(s) with the presentation materials and starts the presentation. After the step 1115, processing proceeds to a step 1120, where the system captures facial images of the participants, as explained elsewhere herein (see, for example, FIG. 3 and the accompanying text). After the step 1120, processing proceeds to a step 1125, where the system captures and records voice feedback by the participants (see FIG. 3 for details). After the step 1125, processing proceeds to a step 1130, where the system captures and records text comments and/or feedback by the participants, as explained elsewhere herein. After the step 1130, processing proceeds to a step 1135, where the system continuously applies the face recognition technology to the captured facial images, as explained, for example, in conjunction with FIGS. 2, 3, 4. After the step 1135, processing proceeds to a step 1140, where the system continuously applies speech and voice emotion recognition to the voice feedback stream. After the step 1140, processing proceeds to a step 1145, where the system feeds the text feedback and the speech to text recognition into the Natural Language Processing component (see FIG. 3 and the accompanying text for more info). After the step 1145, processing proceeds to a step 1150, where the system continuously performs Natural Language Processing.

After the step 1150, processing proceeds to a step 1155, where the system feeds the processed text and the face recognition results into the sentiment analysis component, as explained elsewhere herein. After the step 1155, processing proceeds to a step 1160, where the system builds or updates the Participant Engagement Index (PEI), as explained, for example, in FIGS. 2-4 and the accompanying text. After the step 1160, processing proceeds to a test step 1165, where it is determined whether the PEI value is normal or if there is the end of the video conference. If so, processing is complete; otherwise, processing proceeds to a step 1170, where the system detects and records the deviation from the conference goals (judging by the PEI values and the analytics history). After the step 1170, processing proceeds to a step 1175, where the current deviation from the system goals is compared with the previous deviation during the same video conference (if any). After the step 1175, processing proceeds to a test step 1180, where it is determined whether the PEI has improved since the previous step. If so, processing proceeds to the step 1120, which may be independently reached from the step 1115. Otherwise, processing proceeds to a test step 1182, where it is determined whether the maximum count or time span of background changes has been exceeded. If not, processing proceeds to a step 1185, where decision-making is performed and the system action is chosen, as explained elsewhere herein (see, in particular, FIG. 2 and the accompanying text).

After the step 1185, processing proceeds to a step 1190, where the system searches system resources for the relevant initial or updated audio-visual background content (i.e., for the virtual backdrop and the background audio, as explained elsewhere herein). After the step 1190, processing proceeds to a step 1192, where the audio-visual background of the immersive presentation space is changed. After the step 1192, processing proceeds back to the step 1120, discussed above, which may be independently reached from the step 1115 and the test step 1180. If it was determined at the test step 1182 that the maximum count or time span of background changes has been exceeded, processing proceeds to a step 1195, where the system continues using the best performing among the previously chosen audio-visual backgrounds. After the step 1192, processing proceeds to the step 1120, which may be independently reached from the step 1115 and from the test steps 1180, 1192.

Figure 12:
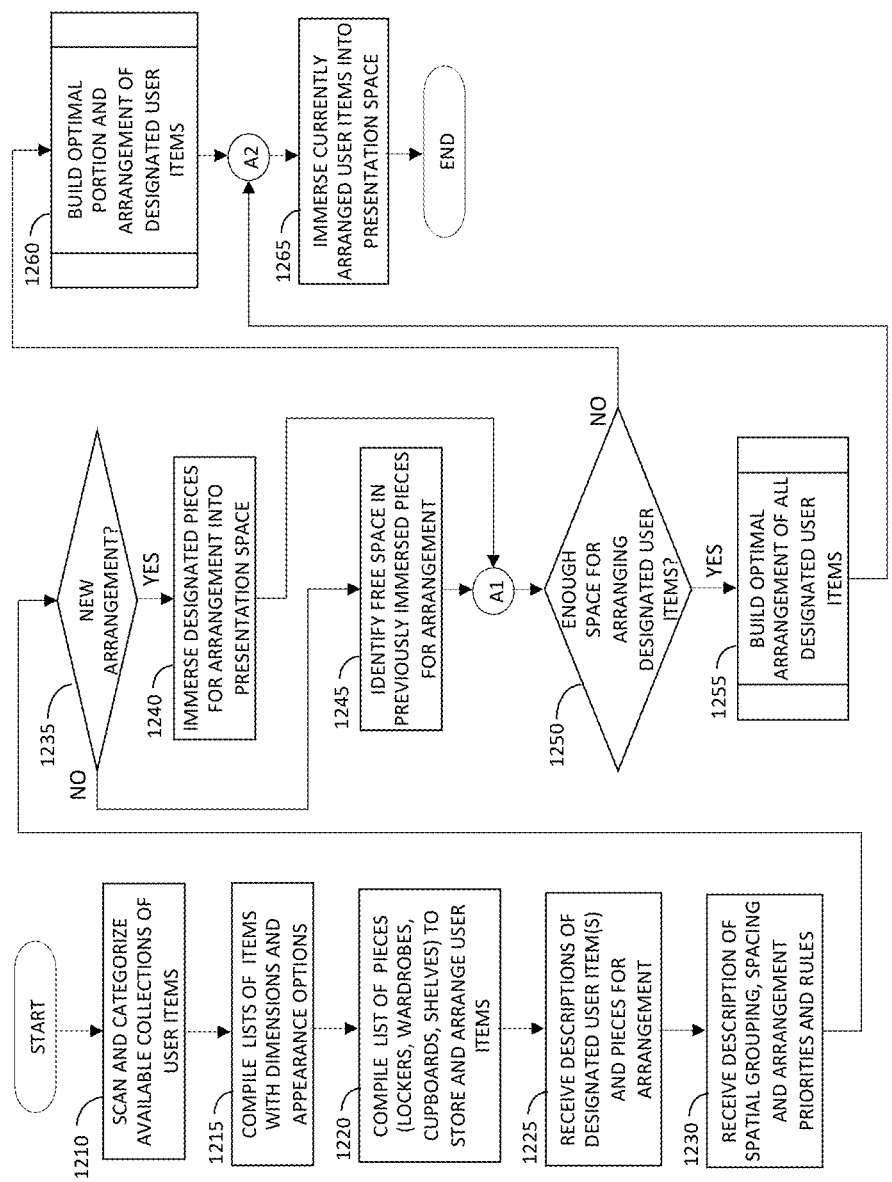
FIG. 12 is a system flow diagram illustrating system functioning in connection with arranging of immersive user items, according to an embodiment of the system described herein.

Referring to FIG. 12, a system flow diagram 1200 illustrates system functioning in connection with arranging of immersive user items. Processing begins at a step 1210, where the system scans and categorizes available collections of user items. After the step 1210, processing proceeds to a step 1215, where a list of items with dimensions and appearance options is compiled. After the step 1215, processing proceeds to a step 1220, where a list of pieces available for storing and arranging user items from previous step (lockers, wardrobes, cupboards, shelves, bookcases, etc.) is compiled, also with dimensions and appearance options. After the step 1220, processing proceeds to a test step 1225, where descriptions of designated user items and pieces for arrangements is received (for example, a bookcase and a list of recently purchased books resulting from a query of the presenter, explained in FIG. 10 and the accompanying text). After the step 1225, processing proceeds to a step 1230, where the description of spatial grouping, spacing between items and arrangement priorities and rules are obtained. After the step 1230, processing proceeds to a test step 1235, where it is determined whether the requested arrangement is a new arrangement. If so, processing proceeds to a step 1240, where the designated pieces for arrangement (such as furniture or other containers of user items) are immersed into the presentation space (alternatively, the pieces may be existing things captured by video in the presentation space, as explained elsewhere herein). After the step 1240, processing proceeds to a test step 1250, where it is determined whether there is enough space for arranging the designated user items in the previously immersed or existing pieces. If so, processing proceeds to a step 1255, where an optimal arrangement of all designated user item is built. After the step 1255, processing proceeds to a step 1265, where the currently arranged user items are immersed into the presentations space. After the step 1265, processing is complete.

If it was determined at the test step 1250 that there is not enough space for arranging all designated user items in the immersed (or existing) pieces, processing proceeds to a step 1260, where the system builds an optimal portion and arrangement of designated user items within available space (see, for example, FIG. 10, where only a portion of the recently purchased books are added to the bookcase). After the step 1260, processing proceeds to the step 1265, which may be independently reached from the step 1255.

If it was determined at the test step 1235 that the requested arrangement is not a new arrangement, processing proceeds to a step 1245, where the system identifies the available free space in the previously immersed pieces available for arrangement of the designated user items (this case is described in conjunction with FIG. 10, where the existing arrangement of books in a bookcase leaves some free space for additional designated user items). After the step 1245, processing proceeds to the test step 1250, which may be independently reached from the step 1240.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functioning may vary from the illustrations presented herein. Further, various aspects of the system described herein may be deployed on various devices, including, but not limited to notebooks, smartphones, tablets and other mobile computers. Smartphones and tablets may use operating system(s) selected from the group consisting of: iOS, Android OS, Windows Phone OS, Blackberry OS and mobile versions of Linux OS. Notebooks and tablets may use operating system selected from the group consisting of Mac OS, Windows OS, Linux OS, Chrome OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of adapting an audio-visual presentation that is presented on a computer display screen of each of a plurality of participants, comprising:
    assessing a degree of engagement for at least some of the participants by monitoring participant reactions and feedback to the audio-visual presentation that is presented on the computer display screen of each of the participants, wherein the feedback includes at least one of: posture, body language or gestures captured by cameras of one or more presenters of the audio-visual presentation and wherein the feedback includes parameters of the audio-visual presentation that include at least one of: complexity and density of visual materials, font size, contrast, and color palette of the visual materials, or frequency of changing slides for the visual materials;
    creating a histogram having a plurality of bins that each represent a number of participants exhibiting a particular degree of engagement;
    comparing histogram values to predetermined engagement goals for the audio-visual presentation;
    modifying the audio-visual presentation by changing virtual backdrops that are viewed on the computer display screen of each of the participants in response to the feedback and to the histogram values indicating deviation from the predetermined engagement goals for the audio-visual presentation; and
    using a trainable automatic classifier to suggest at least one corrective action to the one or more presenters, wherein the trainable automatic classifier is provided with training data that is used to correlate the histogram values indicating deviation from the predetermined engagement goals and the feedback with at least one of: posture of the one or more presenters, talking speed of the one or more presenters, speaking volume of the one or more presenters, time spent on complex slides, time spent on complex portions of the audio-visual presentation, or an increase in complexity of the slides.

2. A method, according to claim 1, wherein degrees of engagement are one of: positive/productive, angry/overreacting, or indifferent.

3. A method, according to claim 1, wherein modifying the audio-visual presentation further includes providing specific audio clips for the audio-visual presentation.

4. A method, according to claim 3, wherein different backdrops and/or different audio clips are provided to different groups of participants.

5. A method of adapting an audio-visual presentation that is presented on a computer display screen of each of a plurality of participants, comprising:
    assessing a degree of engagement for at least some of the participants by monitoring participant reactions and feedback to the audio-visual presentation that is presented on the computer display screen of each of the participants;
    creating a histogram having a plurality of bins that each represent a number of participants exhibiting a particular degree of engagement;
    comparing histogram values to predetermined engagement goals for the audio-visual presentation;
    modifying the audio-visual presentation by changing virtual backdrops that are viewed on the computer display screen of each of the participants in response to the feedback and to the histogram values indicating deviation from the predetermined engagement goals for the audio-visual presentation, wherein modifying the audio-visual presentation further includes providing specific audio clips for the audio-visual presentation; and
    providing alternative corrective action following modifying the audio-visual presentation in response to the histogram values indicating deviation from the predetermined goals for the audio-visual presentation after a predetermined time has passed following modifying the audio-visual presentation, wherein the alternative corrective action includes at least one of: providing an alternative backdrop or providing an alternative audio clip.

6. A method, according to claim 1, wherein the feedback includes verbal and non-verbal cues of the participants.

7. A method, according to claim 6, wherein the non-verbal cues include at least one of: gaze direction and facial expressions that are captured by cameras of the participants or results of physiological monitoring of the participants.

8. A method, according to claim 7, wherein physiological monitoring monitors at least one of: pulse rate, perspiration, facial color, or galvanic skin response.

9. A method, according to claim 6, wherein the verbal cues include at least one of: common or group text chat, voice comments allowed during conference breaks or privately exchanged by groups of meeting participants, or quick polling of individual participants.

10. A method, according to claim 9, wherein the quick polling includes presenting participants with a multiple choice, one-question popup form.

11. A method, according to claim 5, wherein the feedback includes at least one of: posture, body language or gestures captured by cameras of one or more presenters of the audio-visual presentation.

12. A method, according to claim 11, further comprising:
    a virtual coach providing direction to one or more presenters of the audio-visual presentation.

13. A method, according to claim 12, wherein the virtual coach advises the one or more presenters to change posture, speak louder, speak softer, speak slower, speak faster, spend more time on complex slides, and/or skip complex portions of the audio-visual presentation.

14. A method, according to claim 11, wherein the feedback includes parameters of the audio-visual presentation.

15. A method, according to claim 14, wherein parameters of the audio-visual presentation include at least one of: complexity and density of visual materials, font size, contrast, and color palette of the visual materials, or frequency of changing slides for the visual materials.

16. A method, according to claim 15, further comprising:
    using a trainable automatic classifier to suggest at least one corrective action to the one or more presenters.

17. A method, according to claim 5, further comprising:
using a trainable automatic classifier to determine how to change virtual backdrops or provide specific audio clips in response to the histogram values.

18. A method of adapting an audio-visual presentation that is presented on a computer display screen of each of a plurality of participants, comprising:
assessing a degree of engagement for at least some of the participants by monitoring participant reactions and feedback to the audio-visual presentation that is presented on the computer display screen of each of the participants;
creating a histogram having a plurality of bins that each represent a number of participants exhibiting a particular degree of engagement;
comparing histogram values to predetermined engagement goals for the audio-visual presentation;
modifying the audio-visual presentation by changing virtual backdrops that are viewed on the computer display screen of each of the participants in response to the feedback and to the histogram values indicating deviation from the predetermined engagement goals for the audio-visual presentation, wherein modifying the audio-visual presentation further includes providing specific audio clips for the audio-visual presentation; and
using a trainable automatic classifier to determine how to change virtual backdrops or provide specific audio clips in response to the histogram values, wherein the trainable automatic classifier is provided with training data that includes histogram values indicating deviation from the predetermined goals for the audio-visual presentation, one or more backdrops and/or audio clips that were provided in response thereto, and subsequent changes in participant engagement levels.

19. A non-transitory computer readable medium containing software that adapts an audio-visual presentation that is presented on a computer display screen of each of a plurality of participants, the software comprising:
executable code that assesses a degree of engagement for at least some of the participants by monitoring participant reactions and feedback to the audio-visual presentation that is presented on the computer display screen of each of the participants;
executable code that creates a histogram having a plurality of bins that each represent a number of participants exhibiting a particular degree of engagement;
executable code that compares histogram values to predetermined engagement goals for the audio-visual presentation;
executable code that modifies the audio-visual presentation by changing virtual backdrops that are viewed on the computer display screen of each of the participants in response to the feedback and to the histogram values indicating deviation from the predetermined engagement goals for the audio-visual presentation, wherein modifying the audio-visual presentation further includes providing specific audio clips for the audio-visual presentation; and
executable code that provides alternative corrective action following modifying the audio-visual presentation in response to the histogram values indicating deviation from the predetermined goals for the audio-visual presentation after a predetermined time has passed following modifying the audio-visual presentation, wherein the alternative corrective action includes at least one of: providing an alternative backdrop or providing an alternative audio clip.

* * * * *